United States Patent
Gabriel et al.

(10) Patent No.: US 10,474,940 B2
(45) Date of Patent: Nov. 12, 2019

(54) FLEXIBLE RADIO FREQUENCY IDENTIFICATION TAGS

(71) Applicant: 3M INNOVATIVE PROPERTIES COMPANY, St. Paul, MN (US)

(72) Inventors: Nicholas T. Gabriel, Woodbury, MN (US); Ronald D. Jesme, Plymouth, MN (US); Andrew P. Bonifas, Edmonton (CA); Dylan T. Cosgrove, Oakdale, MN (US); John P. Baetzold, North St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/531,749

(22) PCT Filed: Dec. 9, 2015

(86) PCT No.: PCT/US2015/064607
§ 371 (c)(1),
(2) Date: May 31, 2017

(87) PCT Pub. No.: WO2016/105942
PCT Pub. Date: Jun. 30, 2016

(65) Prior Publication Data
US 2017/0364787 A1  Dec. 21, 2017

Related U.S. Application Data

(60) Provisional application No. 62/095,913, filed on Dec. 23, 2014.

(51) Int. Cl.
*G06K 19/077* (2006.01)
*G06K 19/07* (2006.01)

(52) U.S. Cl.
CPC ..... *G06K 19/0772* (2013.01); *G06K 19/0723* (2013.01); *G06K 19/0776* (2013.01); *G06K 19/07728* (2013.01)

(58) Field of Classification Search
CPC ......... G06K 19/07758; G06K 19/0776; G06K 19/0772; G06K 19/07722;
(Continued)

(56) References Cited

U.S. PATENT DOCUMENTS 5,834,755 A * 11/1998 Haghiri-Tehrani ............ G06K 19/07728
235/492
6,217,685 B1 * 4/2001 Leydier ............ G06K 19/07745
156/242

(Continued)

FOREIGN PATENT DOCUMENTS

| CN | 102610534 | 7/2012 |
| EP | 2 187 344 | 5/2010 |

(Continued)

OTHER PUBLICATIONS

Machine translation of JP-08267973, retrieved Mar. 13, 2019, Japanese Patent Office <https://www4.j-platpat.inpit.go.jp/eng/tokujitsu/tkbs_en/TKBS_EN_GM301_Detailed.action>(Year: 2019).*

(Continued)

*Primary Examiner* — Suezu Ellis
(74) *Attorney, Agent, or Firm* — Jonathan L. Tolstedt

(57) ABSTRACT

Flexible, stretchable RFID tags are formed by a pocket that is formed from one or more substrates and layers of adhesive, and an electronic circuit that is located within this pocket. The RFID tags can include a stretchable substrate and an electronic circuit attached to the stretchable substrate by one or a finite number of discrete spaced apart attachment locations. When the pocket is formed by relatively thick adhesive layers adhering together one or more flexible (Continued)

substrates to form an internal cavity, the electronic circuit is located within this cavity and either is not adhered to any of the substrates of the cavity, and is free to move about within the cavity, or the electronic circuit can be attached to a substrate by a thin layer of adhesive.

11 Claims, 1 Drawing Sheet

(58) Field of Classification Search
CPC ....... G06K 19/07726; G06K 19/07775; G06K 19/07745; G06K 19/07747
See application file for complete search history.

(56) References Cited

U.S. PATENT DOCUMENTS

| | | | |
|---|---|---|---|
| 7,969,307 | B2 | 6/2011 | Peeters |
| 8,819,918 | B2* | 9/2014 | Ayala ............... G06K 19/07745 235/492 |
| 2006/0163367 | A1* | 7/2006 | Choi .................... G06K 19/077 235/492 |
| 2006/0164250 | A1 | 7/2006 | Kawai |
| 2007/0186677 | A1* | 8/2007 | Zunino, III ............. G01L 1/148 73/849 |
| 2009/0079545 | A1 | 3/2009 | Chow et al. |
| 2010/0051701 | A1* | 3/2010 | Ogata ............... G06K 19/07722 235/492 |
| 2013/0140193 | A1 | 6/2013 | Pedicano et al. |
| 2014/0361086 | A1* | 12/2014 | Finn ..................... B23K 26/361 235/488 |
| 2016/0014919 | A1* | 1/2016 | Huitema ............... G06F 1/1652 313/511 |

FOREIGN PATENT DOCUMENTS

| | | |
|---|---|---|
| JP | 08267973 A * | 10/1996 |
| WO | 2005/122285 | 12/2005 |
| WO | 2011/041727 | 4/2011 |
| WO | 2011/066358 | 6/2011 |

OTHER PUBLICATIONS

PCT International Search Report from PCT/US2015/064607; dated Mar. 1, 2016, 5 pages.

* cited by examiner

FLEXIBLE RADIO FREQUENCY IDENTIFICATION TAGS

FIELD OF THE DISCLOSURE

The present disclosure relates to flexible radio frequency identification (RFID) tags.

BACKGROUND

Radio frequency identification (RFID) tags have become widely used for a variety of different purposes. There are generally two different types of RFID tags, active and passive. Active RFID tags require a power source to transmit a signal, whereas passive RFID tags contain a transponder that is powered by a signal from an RFID reader.

As the use of RFID tags has expanded, a variety of methods have been developed to expand the usability of RFID tags. PCT Publication No. WO 2005/122285 describes methods and devices for fabricating printable semiconductor elements and assembling printable semiconductor elements onto substrate surfaces to provide a wide range of flexible electronic and optoelectronic devices. PCT Publication No. WO 2011/041727 describes a protective case for a wireless electronic device that includes one or more output devices integrated with or bonded to the protective case, from which a perceivable output is generated. U.S. Patent Publication No. 2013/0140193 describes an insert for enclosing electronics, the insert may be inserted into a stretchable object. In U.S. Pat. No. 7,969,307 an integrated wireless chip diagnostic sensor system is described that can be interrogated remotely with a wireless device.

SUMMARY

The present disclosure relates to flexible radio frequency identification (RFID) tags. In some embodiments, the stretchable radio frequency identification tag comprises a flexible stretchable first substrate, a second substrate spaced apart from the first substrate and attached to the first substrate at a finite number of discrete spaced apart attachment locations, the attachment locations defining an air gap between and substantially coextensive with the first and second substrates, and an electronic circuit disposed on the second substrate.

Also disclosed are stretchable articles comprising a more stretchable first substrate, a less stretchable second substrate suspended from the first substrate from a finite number of attachment points, and an electronic circuit disposed on the second substrate, such that when the article is stretched, the first substrate undergoes a greater strain than the second substrate and the electronic circuit.

In some embodiments, the stretchable radio frequency identification tag comprises a flexible stretchable first substrate, an adhesive layer disposed on a major surface of and substantially coextensive with the first substrate, the adhesive layer having a thicker border region and a thinner interior region, and an electronic circuit disposed directly on the interior region of the adhesive layer.

In still other embodiments, the stretchable radio frequency identification tag comprises a flexible stretchable first substrate, a flexible stretchable third substrate substantially coextensive with and attached to the first substrate along a periphery of the first and third substrates, the first and third substrates defining an air gap therebetween substantially coextensive with the first and third substrates, and an electronic circuit disposed and floating within the air gap and unattached to the first and third substrates.

BRIEF DESCRIPTION OF THE DRAWINGS

The present application may be more completely understood in consideration of the following detailed description of various embodiments of the disclosure in connection with the accompanying drawings.

Figure 1:
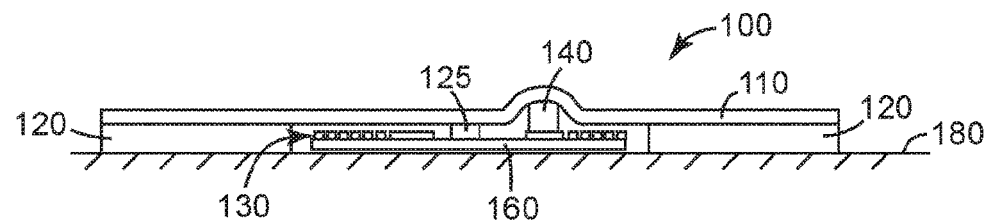
FIG. 1 shows a cross-sectional view of an embodiment of a stretchable RFID article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The increased use of RFID (radio frequency identification) tags has placed increasing requirements on these tags including uses not previously foreseen. For example, in some uses it may be desirable to have an RFID tag that is worn by a person or animal (such as pets or cattle for example). These uses require RFID tags that have a level of flexibility and/or stretchability not needed when the RFID is mounted to a relatively rigid surface.

There are several different ways in which to increase the flexibility and/or stretchability of an RFID tag. In the background section above, methods of making the RFID device itself flexible or stretchable are described. All of these techniques require modification of the RFID device.

In the present disclosure, tag constructions are described in which a relatively rigid RFID device is included in a tag construction where the tag construction is designed in such a way that it provides flexibility and/or stretchability. In this way a conventional RFID device can be used without modification.

By RFID device it is meant a passive RFID transponder, that is to say the electronic circuit portion of the RFID system which is read or written by a reader. The electronic circuit is part of an RFID tag. The RFID tag includes not only the electronic circuit but also various other substrates, adhesive layers and other non-electronic components.

In this disclosure, several embodiments are disclosed for preparing a stretchable RFID tag. In one embodiment, the substrates of the RFID tag are stretchable and the electronic circuit of the RFID tag is attached to one of the stretchable substrates by one or a finite number of discrete spaced apart attachment locations such that stresses placed upon the tag are absorbed by the substrates and the electronic circuit does not feel the stresses.

In another embodiment, the substrates are bonded by relatively thick adhesive layers which form an internal cavity. The electronic circuit is located within this cavity and is not adhered to any of the substrates of the cavity. In this way, the electronic circuit is free to move about within the cavity and when stresses are applied to the tag, the substrates and adhesive layers absorb the stress and the electronic circuit does not feel the stress.

In another related embodiment, a pocket is formed by one substrate and a layer of thick adhesive around the perimeter. The electronic circuit is located within the pocket but is attached to the substrate by a thin layer of adhesive.

In each of the embodiments, a pocket is formed from one or more substrates and layers of adhesive. The electronic circuit is located within this pocket. In one embodiment, the electronic circuit is not attached to any substrate and is free to move within the pocket, in another embodiment the electronic circuit is attached to a substrate by one or a finite number of discrete spaced apart attachment locations, in another embodiment the entire electronic circuit is bonded to a substrate. Each of these embodiments is designed in such a way that the substrates and adhesive layers absorb stresses and are stretchable and flexible protecting the relatively inflexible electronic circuit from the stresses.

The embodiments are more fully explained by the Figures. FIG. 1 is a cross-sectional view of the embodiment with a pocket in which the electronic circuit is attached to a substrate by one or a finite number of discrete spaced apart attachment locations. This figure shows article 100, which is attached to a base substrate 180. Base substrate 180 can be, for example human skin if the device is attached to a person, or it could be a release liner or other protective substrate if the article is being transported or stored prior to use, or it can be a variety of other substrate types.

The article 100 includes a first substrate 110. Coated on first substrate 110 is adhesive 120, in such a way the adhesive surrounds a pocket on first substrate 110. Within the pocket is contained the electronic circuit which comprises a second substrate 160 on which is located antenna 130 (in some embodiments the antenna is in a spiral form) and integrated circuit (IC) 140. The electronic circuit (including second substrate 160, antenna 130, and IC 140) is attached to first substrate 110 by adhesive 125. In this figure, the electronic circuit (including second substrate 160, antenna 130, and IC 140) is attached to first substrate 110 by adhesive 125 at a single attachment point, but it will be easily understood that there can be more than one adhesive 125 attaching the electronic circuit to the first substrate 110 at finite number of discrete spaced apart attachment points, and also that where the adhesive attachment is at a single attachment point that the adhesive can be discontinuously attached to the attachment point (by this is it meant that there can be gaps or slots in the adhesive contacting the first substrate 110). It should also be understood that there can be an air gap located between the second substrate 160 and the base substrate 180 such that the electronic circuit is not resting on the base substrate 180, and even if there is some contact, the second substrate 160 is not adhered to the base substrate 180. In some embodiments, it may be desirable for there to be electrical or physical contact between base substrate 180 and second substrate 160. In FIG. 1, adhesive 120 is shown as having a uniform thickness, but it should also be understood that adhesive 120 can be of variable thickness, and in some embodiments the portions of adhesive 120 that are nearer to the electronic circuit are thicker than the portions of adhesive 120 that are nearer to the exterior edge of first substrate 110.

There can be contact between IC 140 and first substrate 110, either physical contact or electrical contact, or the only contact between the electronic circuit and first substrate 110 may be adhesive 125.

In some embodiments, the first substrate is a flexible stretchable substrate. By this it is meant that the first substrate has the properties of being bendable without cracking (flexible) and can be stretched or compressed in an in-plane direction (stretchable). In some embodiments, the first substrate is capable of being stretched up to 1.5 times the original unstretched dimension of the substrate without tearing. In some embodiments, the first substrate is capable of being stretched up to 2.5 times the original unstretched dimension, or even 3.0 times the original dimension of the substrate without tearing. A wide variety of materials can be used to prepare such a first substrate. Examples of suitable materials include: rubbers, both natural and synthetic; polyurethanes; silicones; and the like. In some embodiments, the first substrate is a film substrate with a thickness of from 10 micrometers to 50 micrometers.

The second substrate is typically not the same as the first substrate, generally the second substrate is not a stretchable substrate. The second substrate is a support layer for the electronic circuit and thus is typically less flexible or semi-rigid. Thus the second substrate is substantially less stretchable than the first substrate.

A wide variety of materials can be used to prepare such a second substrate. Examples of suitable materials include: polyesters, such as polyethylene terephthalate (PET); poly (meth)acrylates; polyolefins such as polyethylene, polypropylene, blends of polyolefins and the like; polyurethanes; polyimides; and the like. In some embodiments, the second substrate is a film substrate with a thickness of from 1 micrometer to 200 micrometers.

The wide range of adhesives can be used in the embodiments of this disclosure. Among the classes of suitable adhesives are pressure sensitive adhesives. Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. Among the suitable classes of pressure sensitive adhesives are (meth)acrylate (the term (meth)acrylate denotes both acrylates and methacrylates) pressure sensitive adhesives, block copolymer-based pressure sensitive adhesives and silicone pressure sensitive adhesives.

As described above, some embodiments include a stretchable radio frequency identification tag comprising: a flexible stretchable first substrate; a second substrate spaced apart from the first substrate and attached to the first substrate at a finite number of discrete spaced apart attachment locations, the attachment locations defining an air gap between and substantially coextensive with the first and second substrates; and an electronic circuit disposed on the second substrate.

Also disclosed herein is a stretchable article comprising: a more stretchable first substrate; a less stretchable second substrate suspended from the first substrate from a finite number of attachment points; and an electronic circuit disposed on the second substrate, such that when the article is stretched, the first substrate undergoes a greater strain than the second substrate and the electronic circuit.

In some embodiments, when the stretchable article is stretched, the first substrate undergoes a greater in-plane strain than the second substrate and the electronic circuit. In this way the first substrate absorbs the strain and protects the relatively inflexible electronic circuit from the stresses. For example, the electronic circuit typically includes an antenna, and the resonance frequency of the antenna is typically the same when the article is stretched as the resonance frequency of the antenna in the unstretched state.

Figure 2:
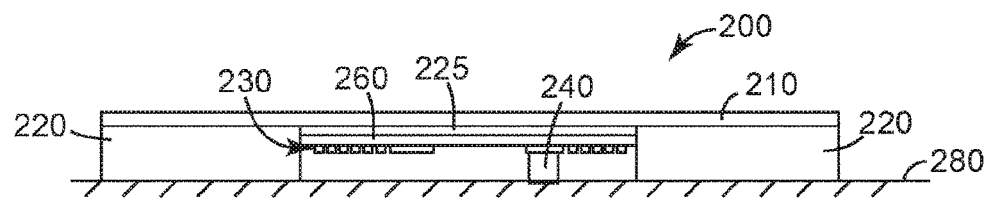
FIG. 2 shows a cross-sectional view of an embodiment of a stretchable RFID article of this disclosure.

FIG. 2 is a cross-sectional view of the embodiment with a pocket in which the entire electronic circuit is bonded to a substrate. This figure shows article 200, which is attached to a base substrate 280. Base substrate 280 can be, for example human skin if the device is attached to a person, or it could be a release liner or other protective substrate if the article is being transported or stored prior to use, or it can be a variety of other substrate types.

The article 200 includes a first substrate 210. Coated on first substrate 210 is adhesive 220, in such a way the adhesive surrounds a pocket on the first substrate 210. Within the pocket is contained the electronic circuit which comprises a second substrate 260 on which is located antenna 230 (in some embodiments the antenna is in a spiral form) and integrated circuit (IC) 240. The electronic circuit (including second substrate 260, antenna 230, and IC 240) is attached to first substrate 210 by adhesive 225. The adhesive 220 is substantially thicker than adhesive 225, such that the electronic circuit contained within the pocket either does not touch base substrate 280, or only the IC 240 touches the base substrate 280. In many embodiments, adhesive 220 and adhesive 225 are the same adhesive, and are part of a single continuous adhesive layer, being thinner at the portions that are adhered to the second substrate, and thicker at the portions not adhered to the second substrate. In other embodiments, adhesive 220 and adhesive 225 comprise different adhesive materials. In still other embodiments, adhesive 220 and adhesive 225 are the same adhesive material, but they do not form a continuous adhesive layer, rather they are discontinuous adhesive layers.

In some embodiments, where the thicknesses of adhesive 220 and adhesive 225 are similar, second substrate 260 are capable of forming a concave curvature (not shown) around the point where the IC 240 touches the base substrate 280. This curvature is also present in the adhesive 225 and first substrate 210. In these embodiments, the adhesive 220 is generally sufficiently thick that there is an air gap present between the antenna 230 and the base substrate 280, thus the only contact between the electronic circuit and the base substrate 280 is IC 240. In some embodiments, this concave curvature forms when the article is applied to the base substrate 280, in other embodiments, this concave curvature can form when the article is stressed while attached to base substrate 280.

In some embodiments, IC 240 not only touches the base substrate 280, but may be adhesively attached to base substrate 280, or may be in electrical or thermal contact with base substrate 280. An example of such an embodiment is an embodiment in which base substrate 280 is human skin and the IC 240 contains sensor elements in contact with the human skin.

Figure 3:
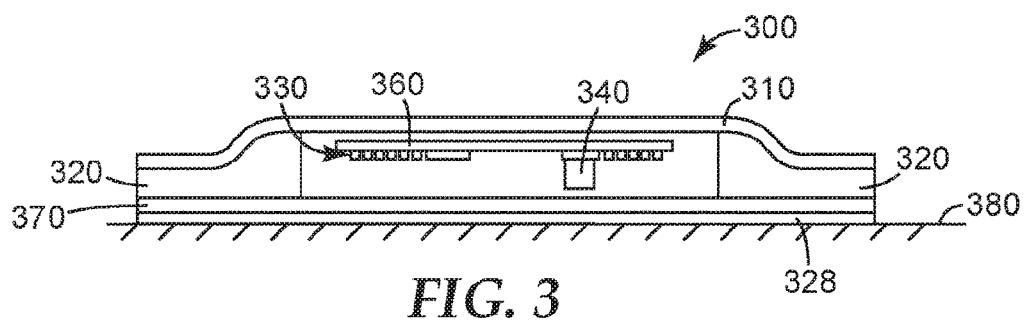
FIG. 3 shows a cross-sectional view of an embodiment of a stretchable RFID article of this disclosure.
Figure 4:
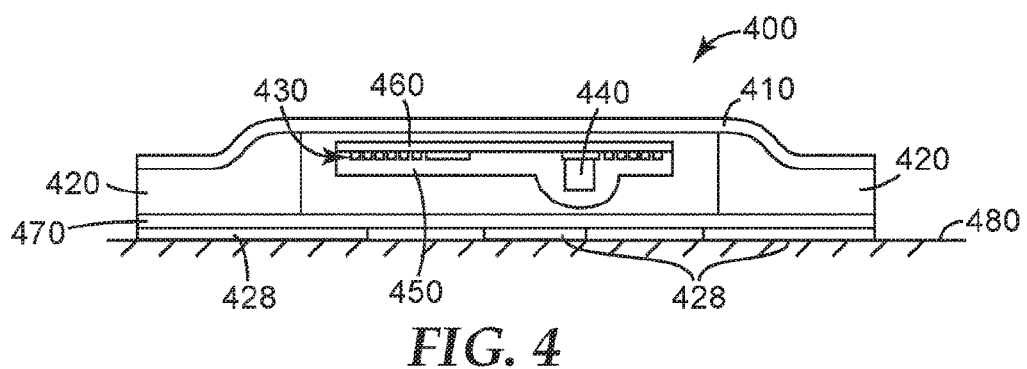
FIG. 4 shows a cross-sectional view of an embodiment of a stretchable RFID article of this disclosure.

FIGS. 3 and 4 are cross-sectional views of embodiments with a pocket in which the electronic circuit is not attached to any substrate and is free to move within the pocket. FIG. 3, shows article 300, which is attached to a base substrate 380 by adhesive layer 328. Base substrate 380 can be, for example human skin if the device is attached to a person, or it could be a release liner or other protective substrate if the article is being transported or stored prior to use, or it can be a variety of other substrate types.

The article 300 includes a first substrate 310 and third substrate 370. Coated between first substrate 310 and third substrate 370 is adhesive 320, in such a way the adhesive surrounds a pocket on the third substrate 370 and the pocket is enclosed by first substrate 310. Adhesive 320 is shown as having variable thickness, being thicker near the pocket and thinner on the edge away from the pocket. Within the pocket is contained the electronic circuit which comprises a second substrate 360 on which is located antenna 330 and integrated circuit (IC) 340. The electronic circuit (including second substrate 360, antenna 330, and IC 340) is not attached to first substrate 310 or third substrate 370 and thus is free to move within the pocket.

The third substrate is flexible and stretchable like the first substrate. The third substrate may be the same as the first substrate, or at least prepared from similar materials.

FIG. 4 shows an article that is similar to the article of FIG. 3. FIG. 4, shows article 400, which is attached to a base substrate 480 by adhesive layer 428. Base substrate 480 can be, for example human skin if the device is attached to a person, or it could be a release liner or other protective substrate if the article is being transported or stored prior to use, or it can be a variety of other substrate types. In the embodiment shown in FIG. 4, the adhesive 428 is a discontinuous adhesive layer, but one can imagine that adhesive layer 428 could also be continuous if desired.

The article 400 includes a first substrate 410 and third substrate 470. Coated between first substrate 410 and third substrate 470 is adhesive 420, in such a way the adhesive surrounds a pocket on the third substrate 470 and the pocket is enclosed by first substrate 410. Adhesive 420 is shown as having variable thickness, being thicker near the pocket and thinner on the edge away from the pocket. Within the pocket is contained the electronic circuit which comprises a second substrate 460 on which is located antenna 430 and integrated circuit (IC) 440, where antenna 430 and IC 440 are covered by protective fourth substrate 450. The electronic circuit (including second substrate 460, antenna 430, IC 440, and protective fourth substrate 450) is not attached to first substrate 410 or the third substrate 470 and thus is free to move within the pocket.

The fourth substrate is typically more flexible than the second substrate since the fourth substrate is a protective layer and is not designed to provide support to the electronic circuit. Additionally, the fourth substrate is typically flexible to cover the irregularly shaped surface of the electronic circuit. Films made from the materials described for the first substrate are also suitable for preparing the fourth substrate.

In some embodiments of the articles of FIGS. 3 and 4, the pocket formed by first substrate 310 or 410 and third substrate 370 or 470 may contain a cushioning material (not shown) to prevent the electronic circuit from contacting the first or third substrates. The cushioning material is non-conductive and also non-adhesive so it does not adhere to the electronic circuit. The cushioning material is present on the surface of the first substrate (310 or 410) or the third substrate (370 or 470) or both. The cushioning material may be attached to the substrate or it may be unattached. Examples of suitable cushioning materials include non-wovens, such as webs of non-woven fibers, and beads such as polymer beads.

The following are items of the present disclosure.

Item 1 is a stretchable radio frequency identification tag comprising: a flexible stretchable first substrate; a second substrate spaced apart from the first substrate and attached to the first substrate at a finite number of discrete spaced apart attachment locations, the attachment locations defining an air gap between and substantially coextensive with the first and second substrates; and an electronic circuit disposed on the second substrate.

Item 2 is the tag of item 1, wherein the flexible stretchable first substrate is stretchable up to 1.5 times an original unstretched dimension of the substrate without tearing.

Item 3 is the tag of item 1, wherein the second substrate is substantially less stretchable than the first substrate.

Item 4 is the tag of item 1, wherein the second substrate is attached to the first substrate at the finite number of discrete spaced apart attachment locations via a corresponding finite number of discrete spaced apart adhesive segments.

Item 5 is the tag of item 1 further comprising an adhesive layer adhered to the first substrate, the adhesive layer defining an opening therein, the second substrate disposed within the opening.

Item 6 is the tag of item 5, wherein when the tag is applied to a surface, the adhesive layer adheres to the surface and the second substrate is confined between the surface, the first substrate and the adhesive layer.

Item 7 is the tag of item 5, wherein the adhesive layer is thinner closer to an edge of the substrate and thicker farther from the edge of the substrate.

Item 8 is the tag of item 1, wherein the electronic circuit comprises an antenna having a spiral form.

Item 9 is the tag of item 1, wherein the finite number of discrete spaced apart attachment locations is a single location.

Item 10 is the tag of item 1, wherein the finite number of discrete spaced apart attachment locations comprises a single attachment location where the adhesive is discontinuously attached to the attachment location.

Item 11 is the tag of item 1, wherein there is electrical contact between the electronic circuit and the flexible stretchable first substrate.

Item 12 is a stretchable article comprising: a more stretchable first substrate; a less stretchable second substrate suspended from the first substrate from a finite number of attachment points; and an electronic circuit disposed on the second substrate, such that when the article is stretched, the first substrate undergoes a greater strain than the second substrate and the electronic circuit.

Item 13 is the article of item 12, wherein when the article is stretched, the first substrate undergoes a greater in-plane strain than the second substrate and the electronic circuit.

Item 14 is the article of item 12, wherein the electronic circuit comprises an antenna, such that when the article is stretched, the resonance frequency of the antenna is essentially the same as the resonance frequency of antenna when the article is in the unstretched state.

Item 15 is a stretchable radio frequency identification tag comprising: a flexible stretchable first substrate; an adhesive layer disposed on a major surface of and substantially coextensive with the first substrate, the adhesive layer having a thicker border region and a thinner interior region; and an electronic circuit disposed directly on the interior region of the adhesive layer.

Item 16 is the tag of item 15, wherein the thinner interior region of the adhesive layer is capable of forming a concave portion disposed on a corresponding concave portion of the major surface of the first substrate, the electronic circuit comprising an integrated circuit (IC) disposed directly on the concave portion of the thinner region of the adhesive layer.

Item 17 is the tag of item 15, wherein the adhesive layer having a thicker border region and a thinner interior region comprises different adhesive materials in the thicker border region than the thinner interior region, or wherein the adhesive layer comprises a discontinuous layer.

Item 18 is the tag of item 15, wherein when the tag is applied to a surface, the electronic circuit contacts the surface, and is either bonded to or is in electrical or thermal contact with the surface.

Item 19 is a stretchable radio frequency identification tag comprising: a flexible stretchable first substrate; a flexible stretchable third substrate substantially coextensive with and attached to the first substrate along a periphery of the first and third substrates, the first and third substrates defining an air gap therebetween substantially coextensive with the first and third substrates; and an electronic circuit disposed and floating within the air gap and unattached to the first and third substrates.

Item 20 is the tag of item 19, further comprising a second substrate disposed and floating within the air gap, the electronic circuit being disposed on the second substrate.

Item 21 is the tag of item 20, further comprising a fourth substrate adjacent to and attached to the second substrate such that the electronic circuit is contained between the second substrate and the fourth substrate.

Item 22 is the tag of item 18, wherein the air gap is at least partially filled with a cushioning material, wherein the cushioning material is non-conductive and non-adhesive, the cushioning material being located on the surface of the first substrate, the surface of the third substrate, or both.

What is claimed is:

1. A stretchable radio frequency identification tag comprising:
    a flexible stretchable first substrate;
    a second substrate spaced apart from the first substrate and attached to the first substrate at a finite number of discrete attachment locations, the
    attachment locations defining an air gap between and substantially coextensive with the first and second substrates;
    an adhesive layer adhered to the first substrate, the adhesive layer defining an opening therein, the second substrate disposed within the opening; and
    an electronic circuit disposed on the second substrate, wherein the flexible stretchable first substrate is stretchable up to 1.5 times an original unstretched dimension of the substrate without tearing.

2. The tag of claim 1, wherein the second substrate is substantially less stretchable than the first substrate.

3. The tag of claim 1, wherein the second substrate is attached to the first substrate at the finite number of discrete attachment locations via a corresponding finite number of discrete adhesive segments.

4. The tag of claim 1, wherein when the tag is applied to a surface, the adhesive layer adheres to the surface and the second substrate is confined between the surface, the first substrate and the adhesive layer.

5. The tag of claim 1, wherein the adhesive layer is thinner closer to an edge of the substrate and thicker farther from the edge of the substrate.

6. The tag of claim 1, wherein the electronic circuit comprises an antenna having a spiral form.

7. The tag of claim 1, wherein the finite number of discrete attachment locations is a single location.

8. The tag of claim 1, wherein the finite number of discrete attachment locations comprises attachment points defined between gaps in the adhesive layer.

9. The tag of claim 1, wherein there is electrical contact between the electronic circuit and the flexible stretchable first substrate.

10. A stretchable article comprising:
   a more stretchable first substrate;
   a less stretchable second substrate suspended from the first substrate from a finite number of attachment points; and
   an electronic circuit comprising an antenna disposed on the second substrate, such that when the article is stretched, the first substrate undergoes a greater in-plane strain than the second substrate and the electronic circuit, and the resonance frequency of the antenna is essentially the same as the resonance frequency of antenna when the article is in the unstretched state.

11. A stretchable radio frequency identification tag comprising:
   a flexible stretchable first substrate;
   a second substrate spaced apart from the first substrate and attached to the first substrate at a finite number of discrete attachment locations, the
   attachment locations defining an air gap between and substantially coextensive with the first and second substrates;
   an electronic circuit disposed on the second substrate; and
   an adhesive layer adhered to the first substrate, the adhesive layer defining an opening therein, the second substrate disposed within the opening.

* * * * *